United States Patent
Casalini et al.

(10) Patent No.: US 11,130,846 B2
(45) Date of Patent: Sep. 28, 2021

(54) AQUEOUS EMULSIONS CONTAINING ETHYLENE-VINYL ACETATE COPOLYMERS, PREPARATION PROCESS THEREOF AND THEIR USE AS ANTI-GELLING ADDITIVES OF CRUDE OILS

(71) Applicants: versalis S.p.A., San Donato Milanese (IT); ENI S.p.A., Rome (IT)

(72) Inventors: Alessandro Casalini, Mantova (IT); Michela Agnoli, Verona (IT); Paolo Mariani, Milan (IT); Romano Lima, Russi (IT); Massimo Merlini, Milan (IT)

(73) Assignees: versalis S.p.A., San Donato Milanese (IT); ENI S.p.A., Rome (IT)

( * ) Notice: Subject to any disclaimer, the term of this patent is extended or adjusted under 35 U.S.C. 154(b) by 371 days.

(21) Appl. No.: 15/779,686

(22) PCT Filed: Dec. 2, 2016

(86) PCT No.: PCT/IB2016/057305
§ 371 (c)(1),
(2) Date: May 29, 2018

(87) PCT Pub. No.: WO2017/093962
PCT Pub. Date: Jun. 8, 2017

(65) Prior Publication Data
US 2020/0291191 A1 Sep. 17, 2020

(30) Foreign Application Priority Data
Dec. 3, 2015 (IT) .................. 102015000079982

(51) Int. Cl.
| | |
|---|---|
| *C08J 3/03* | (2006.01) |
| *C08L 23/08* | (2006.01) |
| *C10L 1/14* | (2006.01) |
| *C10L 1/196* | (2006.01) |
| *C10L 1/197* | (2006.01) |
| *C10L 10/16* | (2006.01) |
| *C10L 1/16* | (2006.01) |

(52) U.S. Cl.
CPC ............ *C08J 3/03* (2013.01); *C08L 23/0853* (2013.01); *C10L 1/143* (2013.01); *C10L 1/1963* (2013.01); *C10L 1/1973* (2013.01); *C10L 10/16* (2013.01); *C08J 2323/08* (2013.01); *C08J 2333/06* (2013.01); *C08J 2433/10* (2013.01); *C08L 2201/54* (2013.01); *C10L 1/1616* (2013.01)

(58) Field of Classification Search
CPC ......... C08J 3/03; C08J 3/05; C08J 3/07; C08J 2323/08; C08J 2333/06; C08J 2433/10; C10L 1/143; C10L 1/1963; C10L 1/1973; C10L 10/16; C10L 1/1616; C08L 23/0853; C08L 2201/54
See application file for complete search history.

(56) References Cited

U.S. PATENT DOCUMENTS

| | | | |
|---|---|---|---|
| 2005/0058712 A1 | 3/2005 | Serpelloni et al. | |
| 2007/0062101 A1* | 3/2007 | Delamotte | C10L 10/16 44/389 |
| 2011/0067295 A1* | 3/2011 | Castro Sotelo | C10L 10/16 44/393 |
| 2011/0237710 A1 | 9/2011 | Serpelloni et al. | |
| 2017/0009067 A1* | 1/2017 | Garcia Castro | C10L 10/16 |
| 2017/0029732 A1* | 2/2017 | Mariani | C10L 1/1973 |

FOREIGN PATENT DOCUMENTS

| | | |
|---|---|---|
| CA | 986635 A | 3/1976 |
| CN | 1875055 A | 12/2006 |
| EA | 011252 B1 | 2/2009 |
| RU | 2 219 197 C2 | 12/2003 |
| RU | 2 547 012 C2 | 4/2015 |
| SU | 1690546 A3 | 11/1991 |
| WO | WO 2014/044583 A1 | 3/2014 |
| WO | WO 2015/083131 A1 | 6/2015 |
| WO | WO 2015/124529 A1 | 8/2015 |

OTHER PUBLICATIONS

Combined Chinese Office Action and Search Report dated May 11, 2020 in Patent Application No. 201680070040.0 (with English language translation), 10 pages.
International Search Report and Written Opinion dated Mar. 31, 2017 in PCT/IB2016/057305, 11 pages.
Decision to Grant dated Dec. 16, 2020 in Russian Patent Application No. 2018121986/04(034785) (with English language translation), 13 pages.

* cited by examiner

*Primary Examiner* — Ellen M McAvoy
(74) *Attorney, Agent, or Firm* — Oblon, McClelland, Maier & Neustadt, L.L.P.

(57) ABSTRACT

The present invention relates to an aqueous emulsion comprising: a) from 50% to 60% of an organic phase dispersed in an aqueous phase, said organic phase containing a mixture including from 24% to 30%, calculated with respect to the final emulsion, of ethylene-vinyl acetate copolymers and/or polyalkyl(meth)acrylates, indicated in the present description as polymeric component, and a high-boiling organic solvent, or a mixture of said solvents; b) a primary emulsifier at a concentration higher or equal to 0.1% and lower than or equal to 3% by weight, calculated with respect to the final emulsion; c) from 37% to 47% of an aqueous phase; wherein the ratio between said polymer component and said organic solvent in the final aqueous emulsion is at least 1/1 and where the organic solvent and any polymer of the polymeric component have a Hildebrand solubility parameter δ such that, the difference ($\delta_{solvent} - \delta_{polymer}$) is lower than 2 in absolute value for any polymer of the polymeric component.

25 Claims, No Drawings

AQUEOUS EMULSIONS CONTAINING ETHYLENE-VINYL ACETATE COPOLYMERS, PREPARATION PROCESS THEREOF AND THEIR USE AS ANTI-GELLING ADDITIVES OF CRUDE OILS

The present invention relates to aqueous emulsions containing ethylene-vinyl acetate copolymers and/or polyalkyl (meth)acrylates and preparation process thereof.

Furthermore the present invention relates to the use of said aqueous emulsions as anti-gelling additives of crude oils (indicated herein as "Pour Point Depressant" additives or PPD).

Furthermore, the present invention relates to an innovative process for preparing aqueous emulsions containing ethylene-vinyl acetate copolymers and/or polyalkyl(meth)acrylates, which are easily injectable into oil pipelines.

The present invention finds application in the field of "Pour Point Depressants", i.e. substances mainly of polymer nature, capable of interacting with paraffins present in the waxy crude oils, thus impeding their crystallization and reducing the gelling temperature or the "Pour Point" of the fluid treated below a specific threshold considered to be suitable for a certain use or transportation.

For the aims of the present disclosure the term polymer also includes copolymers and homopolymers.

For the aims of the present disclosure all the operating conditions reported herein are to be intended as preferred conditions even if not expressly stated.

For the aims of the present disclosure the term "comprising" or "including" also comprises the term "consisting of" or "consisting essentially of".

For the aims of the present disclosure, the definitions of the ranges always comprise the extremes unless otherwise specified.

The gelification of the crude oils by crystallization of the paraffinic components represents an important problem for their transportation in pipelines, in particular for those crude oils characterized by high wax contents. The cooling of the petroleum causes the gradual crystallization of paraffins (especially of linear paraffins) present inside it, with the resulting formation of a three-dimensional network capable of retaining the part of crude oil which is still liquid. This leads to an increase of petroleum viscosity, until achieving its complete gelification, causing problems during the transportation in pipelines, mainly as a result of extended days of inactivity.

The gelification of crude oils is usually counteracted by adding low concentrations, for example between 50 ppm and 1000 ppm, of "Pour Point Depressant" additives, which are capable to hinder the crystallization of paraffins, by modifying crystal morphology and reducing the gelling temperature.

The patent application WO 2015/083131, in the name of the Applicant, describes compositions suitable for decreasing the Pour Point of paraffinic crude oils. Said composition comprises at least two ethylene-vinyl acetate copolymers having an average molecular weight (Mw) lower than 130000 Daltons, and a content of vinyl acetate monomer comprised between 15% and 50% by weight, respectively, with the proviso that the content of vinyl acetate mononomer in the respective copolymers differs from one another for a value higher than 5% on a weight base.

These compositions showed to be very effective in reducing the Pour Point temperature of waxy crude oils. Furthermore, the addition of polyalkyl(meth)acrylates to the above-mentioned formulations resulted in a further improvement of additive effectiveness. Finally, the possible addition of surfactants, such as ethoxylated alkylphenols, such as dispersing agents at low concentrations (up to 200 ppm) to said compositions allows to reduce the deposit of waxes on pipeline walls.

In order to transport additives within the petroleum, the "Pour Point Depressant" additives are preventively solubilized in organic solvents or dispersed in emulsion by using an appropriate emulsifier. The preparation of aqueous dispersions of "Pour Point Depressant" polymers has the advantage of obtaining emulsions characterized by low viscosity at room temperature, but at the same time by high concentrations of polymer, until 30%, which can be easily pumped without any needing to heat.

Aqueous emulsions of ethylene-, propilene-based polymers and copolymers thereof are commonly prepared and used in various fields of application, meanly for coatings. Numerous examples of patents and patent applications known in literature describe the preparation of aqueous emulsions of ethylene-, propylene-based polymers and copolymers thereof with acrylic compounds or vinyl acetate having a different molecular weight, by using an extruder. The emulsions thus prepared are used as coatings, mainly in the paper processing process or in the manufacture of paints, but also for the additivation of crude oils.

U.S. Pat. No. 2,496,989 discloses aqueous dispersions containing a dispersed solid ethylene polymer and a dispersing agent which is an ammonium salt or a water-soluble basic amine of styrene-maleic anhydride copolymers. Furthermore, U.S. Pat. No. 2,496,989 discloses the preparation of said aqueous dispersions of ethylene copolymers which are used as coating on fibers and paper.

U.S. Pat. No. 3,356,629 discloses a process for preparing aqueous dispersions of high molecular weight polymers, including ethylene-acrylates copolymers and EVA copolymers. The polymer is fed into an extruder and additivated, after the melting in the mixture zone, with a water-immiscible solvent and with an aqueous solution of an emulsifier. The used solvents are of the aromatic type, aliphatic type or trichloroethylene. The ratio between aqueous solution and solvent ranges from 1/4 to 1/10 by weight. The additivation is followed by a mixing step wherein the ratio between the liquid mixture and the dispersed polymer ranges from 2.5/1 to 6/1 by weight. Then the emulsion is mixed at a temperature which ranges from 70° C. to 120° C. and the solvent feed is then removed by hot stripping (70° C.) leaving a colloidal dispersion of the solid polymer into an aqueous medium.

U.S. Pat. No. 4,174,335 discloses aqueous dispersions of olefin polymers and preparation process thereof. The aqueous dispersions comprise particles of dimensions ranging from 3 μm to 100 μm dispersed into an aqueous medium which does not contain a solvent; said particles contain an olefin resin free of carboxylic groups, such as Ethylene-Vinyl Acetate copolymers, and an olefin resin having carboxylic groups, for example acrylic acid-grafted polyethylene.

Resins are mixed and then dispersed in water at a temperature comprised between 140° C. and 300° C. in the presence of the resin containing carboxylic groups.

U.S. Pat. No. 4,970,258 discloses aqueous dispersions of a hydrophobic resin which is used for its water-resistance properties, chemical resistance and adhesion properties.

The aqueous dispersion disclosed in U.S. Pat. No. 4,970,258 comprises:

(i) a hydrophobic thermoplastic resin which can be selected from polyolefins, alpha-olefin copolymers and block copolymers, vinyl-ethylene copolymers such as ethylene-vinyl acetate copolymers, styrene resins, polyvinyl compounds such as polymethyl-acrylates and polymethyl-methacrylates, polyamides, thermoplastic polyesters, polycarbonates and polyphenylene oxides, (ii) a water-insoluble thermoplastic polymer functionalized with carboxylic groups and capable of swelling again into a non-aqueous solvent.

Optionally the disclosed composition contains from 3% to 90% by weight of water calculated with respect to the total composition, an anionic surfactant or an organic solvent. Said dispersion has an electric resistance lower than $10^6$ $\Omega$-cm.

The used organic solvent can be selected from aromatic hydrocarbons such as benzene, toluene, xylene, styrene, alpha-methylstyrene and divinylbenzene; aliphatic hydrocarbons and halogenated hydrocarbons. The dispersions according to U.S. Pat. No. 4,970,258 are prepared by extrusion of the hydrophobic thermoplastic resin (i), of the thermoplastic polymer functionalized with carboxylic groups (ii) neutralizable and/or salifiable, and optionally of an organic solvent. The organic solvent can be contained in the final aqueous dispersion or can be removed.

U.S. Pat. No. 6,512,024 discloses the preparation of polymer dispersions or emulsions into aqueous or non-aqueous means by extrusion. The process provides that a melt or liquid dispersed phase is mixed with a liquid continuous phase: the dispersed phase is a polymer selected from epoxy resins, polyhydroxy amino ether resins, polyesters, polyurethanes, ethylene-acrylic acid copolymers or mixture thereof.

U.S. Pat. No. 6,767,956 discloses a process by extrusion for preparing aqueous polymer dispersions, among which polyesters, polyamides, polycarbonates, polyolefins, polyurethanes, polyureas, polyamides, phenoxy resins and mixtures thereof. The aqueous medium can contain an organic solvent up to 40%.

U.S. Pat. No. 7,935,755 discloses an aqueous dispersion comprising at least one thermoplastic resin, at least one dispersing or emulsifying agent and water, wherein the dispersion has a pH lower than 12 or the dispersed particle size is lower than 5 µm. The thermoplastic resins comprise ethylene copolymers with $C_4$-$C_{20}$ dienes, linear, branched or cyclic dienes, or with vinyl esters such as vinyl acetate, or with compounds of formula $H_2C=CHR$ wherein R is a linear, branched or cyclic $C_1$-$C_{20}$ alkyl group, or a $C_6$-$C_{20}$ aryl group. The dispersion is prepared into an extruder and used for the manufacture of "heat-sealable" coatings. The preparation mode always consists of polymer melting, mixing with the precursor of an emulsifier (fatty acids), saponification of the emulsifier and final dilution with water.

WO 2012/170242 discloses an aqueous dispersion which can be used as anti-gelling for crude oils comprising ethylene-vinyl acetate (EVA), a dispersing agent and water, optionally an aqueous compound which lowers the freezing point, wherein the amount of EVA ranges from 25% to 60% by weight calculated on the total dispersion.

The dispersing agent is selected from sodium or potassium salts of the oleic acid, stearic acid, behenic acid or erucic acid, or mixtures thereof, preferably in amounts between 1% and 10% by weight. Stabilizer agents, typically selected from certain alcohols or certain copolymers, and further additives, can be also present.

The preparation of the aqueous emulsions according to WO 2012/170242 is carried out into an extruder and provides the initial melting of the polymer and its additivation with the emulsifier or relative acid precursor (for example, the oleic acid). In this latter case the acid is salified by a reaction with a base. The last step consists of a dilution with a final addition of water.

The preparation process of aqueous emulsions of ethylene-, propylene-based polymers, and copolymers thereof, known in the art, comprises the following three steps. The first step provides the mixing of the polymer part with an emulsifier or a precursor thereof. In this first step the polymer is melted and mixed with an emulsifier, typically fatty acid salts; or with a precursor thereof, typically oleic acid or low molecular weight block polymers of type A-B containing a part related to the polymer and a hydrophilic part, such as, for example, acrylic acids. The second step provides the acid neutralization and the preparation in situ of the emulsifier. The acid precursor is neutralized by adding a small amount of alkaline solution, such as, for example, inorganic hydroxides (KOH) in order to make the emulsifier. The neutralization step is not necessary if a ready emulsifier is directly used. The third step provides the final dilution in water. The neutralized mixture is dissolved in water so as to prepare an emulsion at the desired concentration.

During the preparations of polymer emulsions into an extruder known in the art, the organic solvent is generally removed from the final emulsion by hot stripping. The organic solvent is removed, as it is not important for the aims of the final application. It is only added to facilitate the emulsion preparation thus reducing the viscosity of the polymeric fraction and improving the dispersion, such as, for example, in U.S. Pat. No. 3,356,629 and in U.S. Pat. No. 4,970,258 where the organic solvents are used for preparing aqueous emulsions of polymers with a high molecular weight.

According to the state of the art, emulsions are mainly used for manufacturing an additive which is used as protective layer on various manufactures, such as, for examples, paper, articles made of plastic, wood or metal in order to enhance the resistance to chemical substances or solvents or to make "heat-sealable" coatings such as in U.S. Pat. No. 7,935,755. In this type of applications the presence of organic solvent, also at low concentrations, is a disadvantage as it constitutes a complication from the environmental point of view.

On the contrary, the use of high concentrations of organic solvent in the preparation of polymer emulsions, which are used as "Pour Point Depressant" additives, provides some advantages in the final applications. In fact, the presence of a solvent in the organic phase of the emulsion facilitates the solubilization of the PPD additive in the crude oil. The rapid dissolution of the emulsion in the crude oil is an important requirement for the application of such additives.

Therefore it is an object of the present invention an aqueous emulsion comprising:
a) from 50% to 60% of an organic phase dispersed in an aqueous phase, said organic phase containing a mixture including from 24% to 30%, calculated with respect to the final emulsion, of ethylene-vinyl acetate copolymers and/or polyalkyl(meth)acrylates, indicated in the present description as polymeric component, and a high-boiling organic solvent, or a mixture of said solvents;
b) a primary emulsifier at a concentration higher than or equal to 0.1% and lower than or equal to 3% by weight, calculated with respect to the final emulsion;
c) from 37% to 47% of an aqueous phase;
wherein the ratio between said polymeric component and said organic solvent in the final aqueous emulsion is at least 1/1 and where the organic solvent and any polymer of the polymeric component have a Hildebrand solubility parameter δ such that, the difference ($\delta_{solvent}-\delta_{polymer}$) is lower than 2 in absolute value for any polymer of the polymeric component.

In said emulsions which are employed as PDD additives in the crude oils, the ratio between the organic solvent and the polymeric compound must be greater than or equal to 1/1, preferably equal to 3/2. The solvent could be added at concentrations even higher, however a further increase of its concentration, and then an excessive increase of the organic solvent/polymer compound ratio, would compromise the concentration of the PPD agent in the final emulsion and then the effectiveness of the emulsion to reduce the gelling temperature of the crude oil at the concentrations usually used, concentrations ranging in the range of 500-5000 ppm.

It is a further object of the present invention a process for preparing the aqueous emulsions described and claimed, comprising the following steps:

i. mixing together a high-boiling organic solvent, or a mixture thereof, a precursor of the primary emulsifier, preferably an organic acid; ethylene-vinyl acetate copolymers and/or polyalkyl(meth)acrylates; at a temperature that must be higher than the highest melting point among all the polymers present and wherein the ratio between said polymers and said organic solvent is at least 1/1; so as to form an organic solution;

ii. cooling said organic solution at a temperature lower than or equal to 95° C.; or pressurizing at a pressure sufficient to avoid the fast evaporation of water;

iii. adding to said cooled or pressurized solution an alkaline aqueous solution to completely neutralize the organic acid present, thus generating a primary emulsifier and forming an inverse emulsion, comprising an aqueous phase and an organic phase, wherein the aqueous phase is dispersed in the organic phase;

iv. diluting said inverse emulsion with water thus forming a final emulsion, comprising an aqueous phase and an organic phase, wherein the organic phase is dispersed in the aqueous phase.

The addition of a high-boiling organic solvent at high concentrations during the preparation of the aqueous emulsions herein described and claimed, not only aids the preparation of the emulsion, facilitating polymer mixing, but promotes the rapid dissolution of the PPD additive in the crude oil during the application. Said emulsions are also easily injectable into the pipelines.

The best results are obtained when the increase of solvent concentration is accompanied by adding surfactants such as ethoxylated and/or proproxylated alcohols, which facilitate the dispersion of the aqueous emulsion and of the PDD additive within the petroleum.

The mixing of the polymer component and the precursor of the primary emulsifier with high-boiling organic solvents also guarantees an excellent homogenization of the mixture and the "Pour Point Depressant" additive. Furthermore, the used high-boiling organic solvent is cheap and safe from the environmental point of view.

The treatment of crude oils with low concentrations of the emulsions described and claimed, typically from 500 ppm to 5000 ppm, is capable of significantly reducing the gelling temperature, bringing it below the one considered to be suitable for the transportation.

The PPD additives are usually pre-dissolved into a medium, such as an organic solvent, or they are dispersed in an aqueous phase, in order to be transported within the crude oils. Unlike polymer solutions in organic solvent, the preparation of the aqueous emulsions described and claimed in the present description allows to obtain dispersions at high concentrations of polymer phase, which show a reduced viscosity at room temperature and therefore can be easily pumped without heating being necessary. Such additives can be pumped in the transportation pipes and they have to dissolve easily within the crude oil.

DETAILED DESCRIPTION

The present invention will be now described in detail. The present invention relates to an aqueous emulsion comprising:

a) from 50% to 60% of an organic phase dispersed in an aqueous phase, said organic phase containing a mixture including from 24% to 30%, calculated with respect to the final emulsion, of ethylene-vinyl acetate copolymers and/or polyalkyl(meth)acrylates, indicated in the present description as polymeric component, and a high-boiling organic solvent, or a mixture of said solvents;

b) a primary emulsifier at a concentration higher than or equal to 0.1% and lower than or equal to 3% by weight, calculated with respect to the final emulsion;

c) from 37% to 47% of an aqueous phase;

wherein the ratio between said polymer component and said organic solvent in the final aqueous emulsion is at least 1/1 and where the organic solvent and any polymer of the polymer component have a Hildebrand solubility parameter δ such that, the difference ($\delta_{solvent}-\delta_{polymer}$) is lower than 2 in absolute value, preferably lower than 1, for any polymer of the polymer component.

Preferably, the primary emulsifier is present at a concentration comprised in the range from 0.5% to 2.5% by weight, more preferably equal to 1.7% by weight, calculated with respect to the final emulsion.

The organic phase is dispersed in the aqueous phase in the form of particles. The average particle sizes of the dispersed phase are lower than 1.5 μm, preferably in the range from 400 to 500 nm. The average particle sizes affect the stability of the final emulsion: emulsions having a dispersed phase with particles of small sizes are characterized by a higher stability and provide a lower phase separation.

The addition of an organic solvent in polymeric emulsions used for crude oils additivation, not only facilitates the preparation and good dispersion of the polymeric phase into the aqueous phase, but also promotes the following solubilization of the PPD additive within the crude oil during the final application of the emulsion. For this reason, the used organic solvent is not removed once the preparation of the emulsion is finished, as instead reported in several prior art documents (for example, U.S. Pat. No. 3,356,629). Furthermore, the solubilization of EVA copolymers and/or polyalkyl(meth)acrylates mixtures used as PPD additives in a high-boiling organic solvent during the first preparation step of the emulsion improves the homogenization of the emulsion dispersed phase. Emulsion homogeneity is very important, as the effectiveness of the PPD additive is linked to the composition of the dispersed polymer phase. The dispersion of the desired polymer formulation into an organic solvent during the first preparation phase of the emulsion therefore guarantees an optimal homogeneity of the used polymers.

For the aim of the present patent application an high-boiling organic solvent is defined as an organic solvent having a boiling point $T_{bp}$ higher than or equal to 110° C.

Preferably high-boiling organic solvents having $T_{bp}$ higher than or equal to 130° C., more preferably higher than or equal to 179° C., are used.

The used high-boiling organic solvent may be selected from aromatic organic solvents, aliphatic solvents or mixtures thereof. Preferred aromatic organic solvents are trimethylbenzene, xylene as single isomers or mixtures thereof, toluene and aromatic solvent cuts or mixtures thereof.

Preferred aromatic solvent cuts are the heavy aromatic naphthas. Preferred aliphatic solvents are paraffin-based oils, particularly $C_{24-50}$ lubricants.

Preferred mixtures of aromatic organic solvents and aliphatic solvents are mixtures of heavy aromatic naphthas and $C_{24-50}$ lubricating oils in a proportion of 70/30.

The high-boiling organic solvent is added and it is present at a concentration such that a ratio between polymeric component and solvent equal to at least 1/1, preferably equal to 2/3 is reached. As previously explained, however it is preferable to not overdo the added solvent amount in order to avoid an excessive dilution of the polymer phase, namely of the PPD additive, thus compromising the emulsion effectiveness in reducing the gelling temperature of the crude oils at the concentrations usually used, typically ranging between 500-5000 ppm. Therefore it is preferably to limit the solvent concentration so as to maintain a polymer/solvent ratio higher than 1/2.5.

More preferably, the ratio between the polymer component and the solvent ranges from 1/1 to 1/2.5.

The process described and claimed in the present patent application does not provide any solvent removal operation during or at the end of the preparation of the emulsion, therefore the ratio between the polymer phase and the solvent does not change during the preparation of the described and claimed emulsions, and it is also in the final emulsion.

In order to allow an easy preparation of the emulsions and then an effective dispersion of PPD additives within the crude oil, the selected solvents must be good solvents for the PPD polymers used. The capability of the different solvents to solubilize the PPD polymers was determined through the Hildebrand δ solubility parameters, relating them to those of the PPD polymers. Particularly, the selected solvents must be characterized by Hildebrand solubility parameters δ similar to those of the ethylene-vinyl acetate copolymers or polyalkyl(meth)acrylates used, whose values are comprised between 16 MPa$^{1/2}$ and 17.5 MPa$^{1/2}$: the lower the difference, in terms of absolute value, between the solubility parameters of the polymers, and the selected solvents, the more easier the dissolution of the polymer in the organic solvent. Particularly, when the Flory-Huggins relation is complied there is the formation of an homogenous system:

$$X = \frac{V_s}{RT}(\delta_s - \delta_P)^2 + 0.34 < 0.5$$

wherein $V_s$ is the solvent molar volume, R is the gas constant, T is the Kelvin temperature and $\delta_s$ or $\delta_P$ are the Hildebrand solubility parameters of the solvent and of the ethylene-vinyl acetate copolymer or of the polyalkyl(meth)acrylate, respectively.

The solvents used for preparing the emulsions was selected such that the difference of the solubility parameters is lower than 2, preferably lower than 1. Preferably the ethylene-vinyl acetate (EVA) copolymers that may be employed in the present invention, are mixtures of at least two ethylene-vinyl acetate copolymers, having respectively a weight average molecular weight Mw lower than or equal to 130000 Dalton (measured by high temperature Gel Permeation Chromatography, GPC) and a content of vinyl acetate monomer comprised from 15% by weight to 50% by weight, with the clause that the content of vinyl acetate monomer in the respective copolymers differs, one from each other, of at least 5% on a weight base, preferably between 7% and 22%. In other words, the difference of the VA co-monomer concentration, between a EVA copolymer and another, is higher than or equal to 5% by weight.

Preferably the concentration of a EVA copolymer in said mixture is equal to or higher than 5% by weight, more preferably is comprised between 10% by weight and 60% by weight.

Preferably the number of EVA copolymers in the mixture is 2 (two) to 6 (six), more preferably from 3 (three) to 5 (five).

Preferred are EVA copolymers having an weight average molecular weight (Mw) less than or equal to 130000 Dalton, more preferably comprised between 15000 and 125000 Dalton, extremes included, even more preferably between 15000 and 100000, extremes included, most preferably between 25000 and 80000 Dalton, extremes included.

The EVA copolymers used for preparing the emulsions described and claimed in the present description, preferably are mixtures of various degrees, characterized by a content of Vinyl Acetate (VA) ranging from 20% to 40% by weight, and a fluidity index ranging from 20 g/10' to 60 g/10', said EVA copolymers being added in an amount such that reaching maximum concentrations of copolymer equal to 30% in the final emulsion.

In particular, for example, the mixtures of 3 (three) EVA copolymers with a content of VA of 20%, 30% and 40%, respectively, i.e. of 24%, 33%, 40%, respectively, are considered particularly preferred.

The polyalkyl(meth)acrylates which can be employed in the present invention are preferably (meth)acrylic acid esters having formula (1): $CH_2=CR_1-COOR_2$ wherein $R_1$ is an H atom or a methyl group ($CH_3$), while $R_2$ is an aliphatic chain, preferably saturated and linear, characterized by a number of carbon atoms ranging from 8 to 25, more preferably from 12 to 22. Particularly preferred is the use of polyalkyl(meth)acrylates, wherein from 10% to 40% by weight of the polymer consists of (meth)acrylic acid esters having formula (1) where $R_1$ is an H atom or a methyl group ($CH_3$) and $R_2$ is an aliphatic chain, preferably saturated and linear, composed by 12-14 carbon atoms; from 40% to 80% by weight of the polymer consists of (meth)acrylic acid esters having formula (1) where $R_1$ is a H atom or a methyl group ($CH_3$) and $R_2$ is an aliphatic chain, preferably saturated and linear, composed by 16-18 carbon atoms; and from 0-30% by weight of the polymer consists of (meth)acrylic acid esters having formula (1) and where $R_1$ is an H atom or a methyl group ($CH_3$) and $R_2$ is an aliphatic chain, preferably saturated and linear, composed by 18-22 carbon atoms.

In the PPD mixtures of ethylene vinyl acetate copolymers and/or polyalkyl(meth)acrylates, of the described and claimed emulsions, the latter can be present in amounts comprised between 1% and 50% by weight, preferably between 7% and 35% and more preferably between 10% and 30% by weight.

All the used copolymers are capable of interacting with paraffins present in the crude oil, co-crystallizing with them and inhibiting the formation of an extended crystalline structure.

Precursors of the primary emulsifier used in the emulsions object of the present patent application can be selected from fatty acids, preferably selected from linoleic, linolenic, oleic, stearic, erucic, behenic, arachic acid, more preferably oleic acid; or alkyl benzene sulphonic acids, preferably dodecyl benzene sulphonic acid. Said precursors can be preferably used at a concentration comprised between 0.5% and 2% by weight, more preferably between 0.78% and 1.6% by weight with respect to the final emulsion.

In the described and claimed emulsions, a secondary emulsifier of the ionic type can be also present, for example alcohol sulphates characterized by long alkyl chains, preferably selected from ethoxylated lauryl alcohol sulfates, alkyl-diphenyl ether disulfonate, or sodium dodecyl diphenyl ether disulfonate; or of the non-ionic type, preferably selected from the ethoxylated fatty alcohols-based surfactants and/or propoxylated or ethoxylated alkyl-phenols, more preferably selected from ethoxylated and propoxylated $C_{9-11}$ alcohols, ethoxylated lauryl alcohol, ethoxylated nonylphenol. The secondary emulsifier is present in the final emulsion at a concentration lower than or equal to 2.5% by weight, preferably lower than or equal to 1% by weight, more preferably lower than or equal to 0.5% by weight with respect to the final emulsion.

Finally, in the described and claimed emulsions, dispersing agents can also be included, i.e. surfactants characterized by a HLB (Hydrophilic Lipophilic Balance) higher than 10, preferably comprised between 10 and 15; such as, for example, an ethoxylated alkyl($C_8$-$C_{18}$)-phenol, the ethoxylated or propoxylated $C_8$-$C_{18}$ alcohols, $C_2$-$C_6$ alkylates of sorbitol, and mixtures thereof. As indicated in the patent application WO 2015/083131 in the name of the Applicant, such dispersing agents are capable of interacting with paraffins present in the crude oil thus reducing the deposit on the pipeline walls, increasing at the same time the emulsion stability.

The emulsions described and claimed in the present text can be prepared in batch, using both glass reactors and steel autoclaves.

The preparation is carried out by complete solubilization of polymers and emulsifier precursor into a high-boiling organic solvent, forming an organic solution. Then the emulsifier precursor is salified by adding an alkaline solution and finally the obtained preparation is diluted with water.

Hence, a further form of the present invention is a process for preparing the aqueous emulsions described and claimed in the present disclosure, which comprises the following steps:

i. mixing together a high-boiling organic solvent, or a mixture thereof; a precursor of the primary emulsifier, preferably an organic acid; ethylene-vinyl Acetate copolymers and/or polyalkyl(meth)acrylates; at a temperature that must be higher than the highest melting point among all the polymers present and wherein the ratio between said polymers and said organic solvent is at least 1/1; so as to form an organic solution;

ii. cooling said organic solution at a temperature lower than or equal to 95° C.; or pressurizing at a pressure sufficient to avoid the fast evaporation of water;

iii. adding to said cooled or pressurized solution an alkaline aqueous solution to completely neutralize the organic acid present, so generating a primary emulsifier and forming an inverse emulsion, comprising an aqueous phase and an organic phase, wherein the aqueous phase is dispersed in the organic phase;

iv. diluting said inverse emulsion with water thus forming a final emulsion, comprising an aqueous phase and an organic phase, wherein the organic phase is dispersed in the aqueous phase.

During step (i) of the process described and claimed in the present description, an organic solution containing a precursor of the primary emulsifier is prepared. The precursor of the primary emulsifier is mixed with a high-boiling organic solvent, with EVA copolymers and/or polyalkyl(meth)acrylates. In order to achieve the complete homogenization, the temperature during the mixing is brought above the highest melting point among the melting points of the present copolymers.

The precursor of the primary emulsifier added in step (i) is preferably selected from an organic acid such as dodecyl benzene sulphonic acid, or a fatty acid, more preferably is selected from linoleic, linolenic, oleic, stearic, erucic, behenic, arachic acids, more preferably oleic acid.

In the described preparation the organic acid is neutralized by adding an alkaline solution in order to form the primary emulsifier.

Alternatively to the preparation in situ of the primary emulsifier, obtained as described above by salification of its precursor with an alkaline solution, it is possible to directly add to the starting organic solution of step (i) salts of fatty acids above-mentioned, such as potassium oleate or sodium oleate, avoiding in this case the neutralization step of the precursor acid and the generation of the primary emulsifier. However, the additivation of organic acid salts, so of a primary emulsifier already formed, in step (i) causes the deterioration of the obtained emulsions in terms of particle sizes of the dispersed phase with respect to the process previously described, which provides the formation in situ of the primary emulsifier. In fact, the addition of a precursor organic acid, which is easier to mix with the polymer solution of step (i) and its following neutralization with a base allows to obtain a better dispersion of the primary emulsifier in the organic phase.

In view of the high processing temperatures, higher than 100° C., achieved during the step (i), in order to guarantee an effective solubilization of the copolymers in the high-boiling organic solvent and an optimal homogenization, is necessary to reduce the temperature of the mixture to a temperature lower than or equal to 95° C., preferably lower than or equal to 90° C., during the step (ii) and before adding the alkaline solution and the dilution water. In order to guarantee a good homogenization and a good dispersion of the organic phase in the final emulsion, the temperature must however be higher than the highest melting point among those of the polymers present.

Alternatively, in order to guarantee an effective solubilization of the copolymers in the high-boiling organic solvent and an optimal homogenization, it is possible to apply a small pressure to avoid the excessive removal of water by evaporation. The latter solution is preferable as it allows to reduce the preparation times.

During step (iii) the salification or the neutralization of the acid takes place by adding the alkaline solution.

In this step an alkaline solution is added so as to achieve the complete neutralization of the organic acid present in solution and the formation of the primary emulsifier. The formation of an inverse emulsion W/O occurs in step (iii), wherein the aqueous phase (W) is dispersed in the organic phase (O).

Alkaline solutions which can be preferably used are aqueous solutions containing alkali or alkaline earth metal oxides or hydroxides.

In the present description, the alkali metals that can be used are selected from Li, Na, K, Rb and Cs; the alkaline earth metals which can be used are selected from Be, Mg, Ca, Sr and Ba.

Aqueous solutions of alkali metal hydroxides are preferred, particularly selected from hydroxides of Li, Na, K, Rb and Cs, Na or K hydroxides are more preferred.

Aqueous solutions of alkaline earth metal hydroxides are preferred, particularly selected from Be, Mg, Ca, Sr and Ba hydroxides, Mg and Ca hydroxides are more preferred.

Aqueous solutions of potassium hydroxides are more preferred.

Diluted alkaline aqueous solutions are used during the preparation of the emulsion, wherein the selected alkaline compound (base) is present at concentrations lower than or equal to 10%, preferably lower than or equal to 7.5%, and they are introduced in amounts sufficient to achieve the complete neutralization of the precursor of the emulsifier.

In step (iv) the final dilution with water occurs so as to achieve the concentration of the desired polymeric phase in the final emulsion. This step provides the dilution with water and the phase reversal of the emulsion, where the aqueous phase (W) disperses the organic phase (O). In order to enhance the dispersion of the organic phase and reducing the average particle size, it is preferable to initially dilute the emulsion with a water aliquot, preferably 2/3, heated at a temperature similar to the temperature of the reaction mixture, to not immediately lower the temperature and causing an early crystallization of the copolymers. Only after the initial mixture, the temperature of the mixture is rapidly reduced by adding the remaining water, equal to 1/3, at room temperature.

In order to enhance the stability of the final emulsion, during the dilution with water in step (iv), it is preferable to add a secondary emulsifier of the ionic type, for example selected from the alcohol sulphates characterized by long alkyl chains, more preferably selected from the sulfates of ethoxylated lauryl alcohols, or a disulfonate alkyl-diphenyl ether preferably sodium dodecyl diphenyl ether disulfonate; or more preferably a non-ionic surfactant, for example surfactants based on ethoxylated and/or propoxylated fatty alcohols or ethoxylated alkyl phenols, more preferably ethoxylated and propoxylated $C_{9-11}$ alcohols, ethoxylated lauryl alcohol, ethoxylated nonyl phenol. The secondary emulsifier is added at a concentration lower than or equal to 2.5% by weight, preferably lower than or equal to 1% by weight, more preferably lower than or equal to 0.5% by weight with respect to the final emulsion.

The use of such surfactants not only increases the emulsion stability, but also promotes the mixing between aqueous phase and crude oil, significantly improving the dissolution of aqueous dispersion of PPD additives in the crude oil when the emulsion is additivated to the crude oil.

Alternatively, the secondary emulsifier as well as being added during the final dilution with water, step (iv) of the process described and claimed in the present description, can be additivated in the initial step of preparation of the organic solution together with the precursor of the primary emulsifier, step (i) of the process herein described and claimed; or together with the alkaline solution, step (iii) of the process herein described and claimed.

The treatment of crude oils having low concentrations of the described and claimed emulsions, typically from 500 ppm to 5000 ppm, it is capable of significantly reducing the gelling temperature, bringing it below that considered suitable for the transportation. Therefore it is a further object of the present invention a paraffinic crude oil characterized by a Pour Point lower than 10° C. comprising:

A paraffinic crude oil having an average paraffin content higher than or equal to 5% by weight; and from 500 to 5000 ppm, preferably from 600 to 4000 ppm by weight, more preferably from 1000 to 3500 ppm by weight, of the aqueous emulsions described and claimed in the present description.

Various preparation tests of the aqueous emulsions of PPD polymers based on EVA copolymers and/or polyalkyl (meth)acrylates in batch, using both glass reactors and steel autoclaves are reported below. The sizes of the dispersed particles were determined through measurements by Light Scattering (by Coulter Delsa Nano C instrument by Beckman), while the amount of phase dispersed in the emulsion was evaluated by weighing of an emulsion sample before and after the drying into a stove at 50° C., under vacuum for 3 days, reporting the amount of dried matter measured with respect to the dry theoretical data which was attended.

Example 1

6 parts of oleic acid and 100 parts of a mixture of ethylene-vinyl acetate resins to be used as Pour Point Depressant agents, consisting of an EVA degree of 20% VA and 20 g/10' (14%), a copolymer characterized by 28% VA and a fluidity index of 25 g/10' (72%) and a EVA copolymer characterized by 40% VA and a fluidity index of 60 g/10' (14%), were hot dissolved, 110° C., in xylene ($\delta$=18 MPa$^{1/2}$), into a glass reactor. The copolymer/solvent ratio is equal to 1/1. The mixture was cooled at 90° C. before adding 16 parts of 7.5% KOH solution so as to achieve the complete neutralization. Then 185 parts of demineralized water containing 1 part of anionic surfactant, alkyl-diphenyl ether disulfonate (sodium dodecyl diphenyl ether disulfonate) were added at room temperature. An emulsion was obtained at 25% of active phase (i.e. of Pour Point Depressant additive), wherein the dispersed phase is characterized by average particle sizes of about 1.3 µm.

Example 2

The same preparation described in example 1 was carried out using a cut of high-boiling aromatic solvents as solvent ($\delta$=17.5-18 MPa$^{1/2}$, $T_{eb}$=179° C.), a heavy aromatic naphtha.

An emulsion was obtained at 25% of active phase, wherein the dispersed phase is characterized by average particle sizes of about 950 nm.

Comparative Example 1

To verify how the type of solvent affects the preparation of the emulsions, it was decided to use a different solvent for the EVA copolymers. The same preparation described in Example 1 was carried out by using a cut of aliphatic solvents as solvent, a n-alkanes/iso-alkanes mixture characterized by 11 to 14 carbon atoms ($\delta$=15 MPa$^{1/2}$).

An emulsion of 25% active phase was obtained, with a low stability, wherein the dispersed phase is characterized by average particle seizes of about 2.5 µm.

Example 3

The process carried out is the same described in example 2. The EVA copolymers was hot-dissolved (100° C.) in the aromatic solvent used in example 2. The temperature was lowered to 90° C. before adding 6.75 parts of dodecyl benzene sulfonic acid, used as primary emulsifier.

An emulsion of 25% active phase was obtained, wherein the dispersed phase is characterized by average particle sizes of about 970 nm.

Example 4

The preparation was carried out as in the example 2, by hot-dissolving 6 parts of oleic acid; 70 parts of a mixture of EVA copolymers and 30 parts of a polyalkyl(meth)acrylate of formula CH2=CCH$_3$—COOR wherein R is an $C_{12-14}$ aliphatic chain for 25% by weight of the polymer, an $C_{16-18}$ aliphatic chain for 60% by weight of the polymer and an $C_{18-22}$ aliphatic chain for 15% by weight of the polymer in an organic solvent consisting of a mixture of the aromatic solvent used in example 2 and a paraffinic oil in proportions of 7/3. During the final dilution step with water, 160 parts of water containing 1.6 parts of non-ionic surfactant, ethoxylated nonyl phenol, were added at room temperature.

An emulsion of 26% active phase was obtained, wherein the dispersed phase is characterized by average particle sizes of about 690 nm.

Example 5

The preparation was carried out as described in example 4. During the final dilution step (step iv) 175 parts of water containing 1.7 parts of non-ionic surfactant, consisting of an ethoxylated/propoxylated $C_{9-11}$ fatty alcohol were added. The final dilution was carried out by adding to the mixture obtained in step (iii) 117 parts of water heated at the same temperature of the mixture after the addition of the alkaline solution, while the remaining water was added at room temperature to carried out a rapid cooling of the temperature.

A 25% active phase emulsion was obtained, wherein the dispersed phase is characterized by average particles sizes of about 470 nm.

Example 6

The preparation was carried out as reported in example 5, but unlike example 5, 10 parts of secondary emulsifier were added. The secondary emulsifier was tested as dispersing agent for the paraffins present in the crude oil: therefore the concentration of the secondary emulsifier was not increased in order to modify the preparation of the emulsion, but to increase additive performances in the final application.

An emulsion of 25% active phase was obtained, wherein the dispersed phase is characterized by average particle sizes of about 490 nm.

Example 7

The preparation was carried out as reported in example 5, but unlike example 5, 10 parts of the secondary emulsifier were added. The surfactant was added in two different steps of the emulsion preparation: 5 parts were introduced together with the primary emulsifier during step (i), while the remaining 5 parts were added during the final dilution of the emulsion (step iv).

An emulsion of 25% active phase was obtained, wherein the dispersed phase is characterized by average particle sizes of about 420 nm.

Example 8

The performed recipe is similar to what reported for the example 5, but the organic solvent/polymer ratio added during the starting step was increased to 3/2. During the last dilution step 135 parts of water containing 1.7 parts of non-ionic surfactant, ethoxylated nonyl phenol were added.

An emulsion of 25% active phase was obtained, wherein the dispersed phase is characterized by average particle sizes of about 480 nm.

Example 9

The same preparation described in example 2 was repeated into an autoclave reactor. The starting organic solution was heated at 120° C. above the melting temperature of all the polymers added in order to obtain an effective mixing. Before introducing the KOH solution, the pressure of 3 bar was applied inside the reactor in order to avoid a rapid evaporation of the water added. Then an alkaline solution was introduced. The final dilution was carried out by adding 160 parts of water, containing 1.6 parts of secondary emulsifier of the non-ionic type, ethoxylated nonyl phenol.

An emulsion of 26% active phase was obtained, wherein the dispersed phase is characterized by average particle sizes of about 650 nm.

Example 10

The dissolution rate of the emulsions described in example 4, example 5, example 8, comparative example 1 was evaluated in a crude oil characterized by a high concentration of paraffins equal to 21% m/m (datum calculated by applying the BP237 method). The dissolution kinetic of the emulsions was verified by adding samples of crude oil with each of tested emulsions: the tests were carried out in order to compare the various emulsions prepared. The tests was carried out at 60° C. carrying out repeated viscosity measurements of the sample over time, after additive addition. In all the tests the sample was prepared by cold-adding the crude oil 2% by weight with the emulsions, such that the final concentration of the Pour Point Depressant additive was equal to about 5000 ppm in the sample of petroleum. In some cases the prepared emulsions was added before the test with ethoxylated/propoxylated $C_{9-11}$ alcohol, added at 10% to the emulsion to increase the dissolution rate. During the preparation of the sample, the crude oil was heated just above its pouring temperature (30-40° C.) in order to make it easily pourable. The sample was thermostated at 60° C. for 15' and the viscosity of the sample was calculated; after the beginning of the stirring the measurement was repeated at regular time intervals. The stirring was maintained constant for all the samples tested.

Measurements are reported in Table 1.

TABLE 1

| | | Organic solvent present in the sample | Dissolution time (min) |
|---|---|---|---|
| A | Comparative example 1 | 25% | Dissolved in 160 min |
| B | Example 4 | 25% | Dissolved in 100 min |
| C | Example 5 | 26% | Dissolved in 100 min |
| D | Example 5 + 10% etoxylated/propoxylated $C_{9-11}$ Alcohol | 24% | Dissolved in 50 min |
| E | Example 8 | 35% | Dissolved in 70 min |

TABLE 1-continued

| | | Organic solvent present in the sample | Dissolution time (min) |
|---|---|---|---|
| F | Example 8 + 10% etoxylated/propoxylated $C_{9-11}$ Alcohol | 32% | Dissolved in 10 min |

The carried out measurements showed that the dissolution of the prepared emulsions is accelerated by adding the surfactant to the emulsion (case D and F). However, also the increase in concentration of a good solvent in the emulsion leads to an increase in the dissolution rate of the emulsion in the crude oil (case E and F); the best results was obtained by the additivation of the surfactant in the emulsion which had the highest percentage of solvent. On the contrary, the use of a worse solvent in the preparation of the dispersions, not only makes more critical the preparation of the emulsion itself (comparative example 1), but disadvantages the following dissolution of the additive in the crude oil (case A).

Example 11

As well as verifying the dissolution rate of the additive in the crude oil, the emulsions prepared in examples 2 and 4 were tested as Pour Point Depressant additives. The crude oil is the same used for the dissolution tests described in example 10 and is characterized by a high fraction of paraffins equal to 21% m/m (datum measured by applying the BP237 method).

The effectiveness of the emulsions to reduce the gelling temperature of the crude oil was compared to the Pour Point reduction effect presented by organic solutions of the same PPD additives in order to verify that the different transportation of the PPD additives in the crude oil, by dissolution in organic solvent or dispersion in water, do not alter their performance as Pour Point Depressant additives. Such comparative solutions were prepared by hot-dissolution (85° C.) of the same mixtures of EVA copolymers/polyalkyl(meth) acrylates used during the preparation of the emulsions of examples 2 and 4 in xylene 5% by weight. Both the comparative organic solutions and the emulsions were cold-added to the petroleum, heating the crude oil only at the temperature sufficient to make it fluid. Therefore, the samples were mixed by vigorous manual stirring. In all the tests the total concentration of Pour Point Depressant additive which was added was equal to 1000 ppm.

In all the tests, as well as the PPD additive, a dispersing agent was also added, ethoxylated nonyl phenol, at a concentration equal to 200 ppm in the sample of final crude oil. In case of samples supplemented with the comparison organic solutions, the dispersing agent was directly additivated to the crude oil, instead, in the case of samples additivated with aqueous emulsions, the dispersing agent was preventively added to the emulsions. Such dispersing additive does not have any effect as Pour Point Depressant agent, but it is added to the formulation in order to slow or avoid the deposit of paraffin residues.

The Pour Point of the crude oil as such and additivated was measured in conformity with ASTM D5853 and ASTM D97 standards, by "activation" of the crude oil by heat treatment at 85° C. as described in the patent application WO 2015/083131 in the name of the Applicant. The obtained results are reported in table 2.

TABLE 2

| | Additive | | PPD additive concentration (ppm) | Dispersant concentration (ppm) | Pour Point (° C.) |
|---|---|---|---|---|---|
| G | Crude oil as such | | | | 27 |
| H | Crude oil as such | | | 200 | 30 |
| I | 5% Xylene solution | EVA 20-20 | 140 | 200 | 9 |
| | | EVA 28-25 | 720 | | |
| | | EVA 39-60 | 140 | | |
| L | Emulsion example 2 | example 2 emulsion (25%) + ethoxylated nonyl phenol 5% | 963 | | 12 |
| M | 5% Xylene Solution | EVA 20-20 | 100 | 200 | 3 |
| | | EVA 28-25 | 500 | | |
| | | EVA 39-60 | 100 | | |
| | | Polyalkyl meth acrylate $C_{12}$-$C_{22}$ | 300 | | |
| N | Emulsion example 4 | example 3 emulsion(26%) + ethoxylated nonyl phenol 5% | 1000 | | 0 |

All the used additives led to significant reductions of the pouring temperature of the additivated crude oil between 15° C. and 30° C. with respect to the sample as such: in particular the best results were obtained in examples M-N, while the addition of the dispersing agent does not affect on the gelling temperature of petroleum (example H).

The effectiveness of the Pour Point Depressant additive depends on the composition of the mixtures of EVA copolymers and/or polyalkyl(meth)acrylates used as PPD. In the tests which was reported, two different compositions were used of Pour Point Depressant additive: a mixture of EVA copolymers characterized by a different content of VA (EVA 20% VA and 20 g/10' (14%), EVA 28% VA and 25 g/10' (72%) and EVA 40% VA and g/10' (14%)) were used in examples I and L, while the added additive in the examples M-N consists of a mixture of EVA copolymers/polyakyl (meth)acrylates (EVA 20% VA and 20 g/10' (10%), EVA 28% VA and 25 g/10' (50%), EVA 40% VA and 60 g/10' (10%) and $C_{12}$-$C_{22}$ Polialkyl(meth)acrylate (30%)).

The addition of additive by dissolution in organic solvents (examples I and M) or in aqueous emulsion (examples L, N) does not determine any significant difference in the effectiveness of the additive. In fact, the additives used in the examples I-L and in examples M-N led to analogous reductions of the gelling temperature of the crude oil.

The invention claimed is:
1. An aqueous emulsion comprising:
a) from 50% to 60% of an organic phase dispersed in an aqueous phase, said organic phase comprising a mixture comprising from 24% to 30%, calculated with respect to a final emulsion, of ethylene-vinyl acetate copolymers and/or polyalkyl(meth)acrylates, indicated as polymer component, and a high-boiling organic solvent, or a mixture of said solvents;
b) a primary emulsifier at a concentration of 0.1% to 3% by weight, calculated with respect to the final emulsion; and
c) from 37% to 47% of an aqueous phase;
wherein a ratio between said polymer component and said organic solvent in the final aqueous emulsion is at least 1/1 and where the organic solvent and any polymer of the polymer component have a Hildebrand solubility parameter δ such that the difference ($\delta_{solvent}-\delta_{polymer}$) is lower than 2 in absolute value for any polymer of the polymer component.

2. The emulsion according to claim 1, wherein the ratio between the polymer and the high-boiling organic solvent is in a range from 1/1 to 1/2.5.

3. The emulsion according to claim 1, wherein the primary emulsifier is at a concentration in a range from 0.5% to 2.5% by weight, calculated with respect to the final emulsion.

4. The emulsion according to claim 1, wherein high-boiling organic solvent comprises at least one selected from the group consisting of aromatic organic solvents and aliphatic solvents, and the high-boiling organic solvent has a boiling point Tbp higher than or equal to 110° C.

5. The emulsion according to claim 4, wherein the aromatic organic solvent comprises at least one selected from the group consisting of trimethylbenzene, xylene as single isomers or mixtures thereof, toluene and aromatic solvent cuts.

6. The emulsion according to claim 5, wherein the aromatic organic solvent comprises the aromatic solvent cut, which is a heavy aromatic naphtha.

7. The emulsion according to claim 4, wherein the solvent is a mixture of heavy aromatic naphthas and $C_{24-50}$ lubricating oils in a proportion of 70/30.

8. The emulsion according to claim 1, wherein the ethylene-vinyl acetate (EVA) copolymers are present, and are selected from the group consisting of mixtures of at least two ethylene-vinyl acetate copolymers, having respectively a weight average molecular weight Mw lower than or equal to 130000 Dalton, measured by high temperature Gel Permeation Chromatography, and a content of vinyl acetate monomer of from 15% by weight to 50% by weight, wherein the content of vinyl acetate monomer in the respective copolymers differs, one from each other, by at least 5% on a weight basis.

9. The emulsion according to claim 8, wherein the concentration of an EVA copolymer in the mixture is equal to or higher than 5% by weight.

10. The emulsion according to claim 9, wherein the concentration of an EVA copolymer in the mixture is between 10% by weight and 60% by weight.

11. The emulsion according to claim 8, wherein the number of EVA copolymers is from 2 to 6.

12. The emulsion according to claim 8, wherein the EVA copolymers have a weight average molecular weight Mw in a range of 15000 to 100000 Dalton.

13. The emulsion according to claim 1, wherein the EVA copolymers are present, and are mixtures having a content of Vinyl Acetate (VA) which ranges from 20% to 40% by weight, and a fluidity index which ranges from 20 g/10' to 60 g/10', said EVA copolymers being added in an amount such that maximum concentrations of polymer equal 30% in the final emulsion.

14. The emulsion according to claim 1, wherein the polyalkyl(meth)acrylates are present, and are (meth)acrylic acid esters having formula (1) $CH_2=CR_1-COOR_2$ wherein $R_1$ is an H atom or a methyl group $CH_3$, and $R_2$ is an aliphatic chain having a number of carbon atoms ranging from 8 to 25.

15. The emulsion according to claim 14, wherein the polyalkyl(meth)acrylates are present, and are polymers wherein from 10% to 40% by weight of the polymer consists of (meth)acrylic acid esters having formula (1) where $R_1$ is an H atom or a methyl group ($CH_3$) and $R_2$ is an aliphatic chain comprising 12-14 carbon atoms; from 40% to 80% by weight of the polymer consists of (meth)acrylic acid esters having formula (1) where $R_1$ is an H atom or a methyl group ($CH_3$) and $R_2$ is an aliphatic chain comprising 16-18 carbon atoms; and from 0-30% by weight of the polymer consists of (meth)acrylic acid esters having formula (1) and where $R_1$ is an H atom or a methyl group ($CH_3$) and $R_2$ is an aliphatic chain comprising 18-22 carbon atoms.

16. The emulsion according to claim 1, wherein in the polymeric component, the polyalkyl(meth)acrylates are present in an amount of 1% and 50% by weight.

17. The emulsion according to claim 1, further comprising one or more dispersing agents having a Hydrophilic Lipophilic Balance higher than 10.

18. A process for preparing the aqueous emulsion of claim 1, comprising:
    (i) mixing together at least one high-boiling organic solvent, a precursor of the primary emulsifier, ethylene-vinyl acetate copolymers and/or polyalkyl(meth)acrylates, at a temperature higher than the highest melting point among all the polymers present, wherein a ratio between said polymers and said organic solvent is at least 1/1; so as to form an organic solution;
    (ii) cooling said organic solution at a temperature lower than or equal to 95° C.; or pressurizing at a pressure sufficient to avoid a fast evaporation of water;
    (iii) adding to said cooled or pressurized solution an alkaline aqueous solution to completely neutralize the organic acid present, thus generating a primary emulsifier and forming an inverse emulsion, comprising an aqueous phase and an organic phase, wherein the aqueous phase is dispersed in the organic phase; and
    (iv) diluting said inverse emulsion with water thus forming a final emulsion, comprising an aqueous phase and an organic phase, wherein the organic phase is dispersed in the aqueous phase.

19. The process according to claim 18, wherein the primary emulsifier precursors are added at concentrations between 0.5% and 2% by weight with respect to the final emulsion.

20. The process according to claim 18, wherein the primary emulsifier precursors comprise fatty acids or sulfonic benzene alkyl acids.

21. The process according to claim 18, wherein the secondary emulsifier is added in (iv), or in (i) together with the primary emulsifier precursor, or in (iii) together with the alkaline solution.

22. The process according to claim 21, wherein the secondary emulsifier is ionic, non-ionic, or a mixture thereof.

23. The process according to claim 21, wherein the secondary emulsifier is present in the final emulsion at a concentration lower than 2.5% by weight.

24. The process according to claim 18, wherein in (iv) the inverse emulsion is initially diluted with a first portion of water, which is at the temperature of said emulsion, and then after the initial mixing of the first portion of water with the inverse emulsion, the mixture temperature is rapidly reduced by adding a second portion of water, which is at room temperature, wherein the first portion of water is 2/3 a total amount of the first and second portions of water, and the second portion of water is 1/3 a total amount of the first and second portions of water.

25. A paraffin oil having a Pour Point lower than 10° C., and comprising:
    a paraffin crude oil with an average content of paraffins higher than or equal to 5% by weight; and from 500 to 5000 ppm by weight of the aqueous emulsion according to claim 1.

* * * * *